July 23, 1968     H. A. LE MASTER     3,393,466
FISHING LURE
Filed March 28, 1966
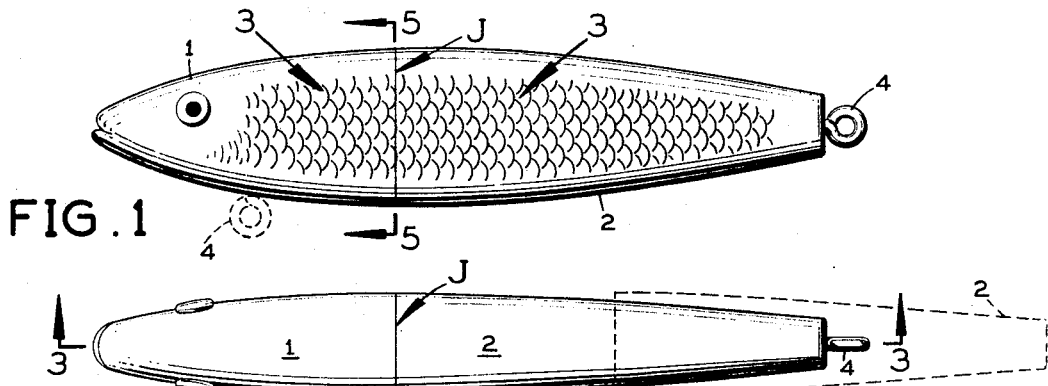
FIG. 1
FIG. 2
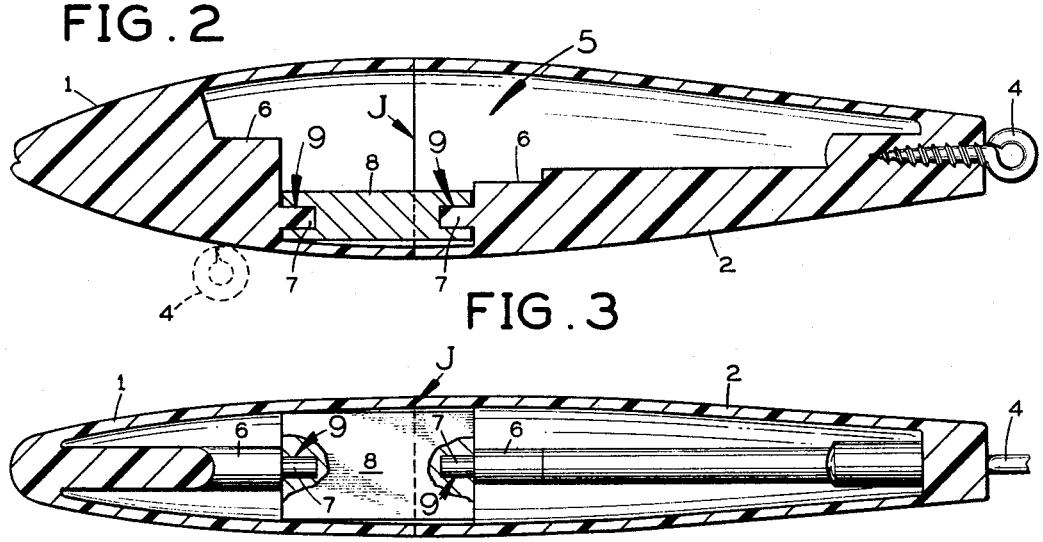
FIG. 3
FIG. 4
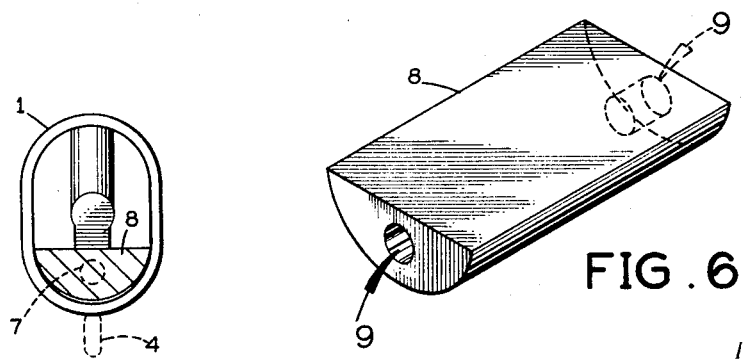
FIG. 5     FIG. 6
INVENTOR.
HAROLD A. LEMASTER
BY
Lloyd J. Andrews

United States Patent Office 3,393,466
Patented July 23, 1968

3,393,466
FISHING LURE
Harold A. Le Master, 701 N. Greenwood Ave.,
Clearwater, Fla. 33515
Filed Mar. 28, 1966, Ser. No. 537,807
1 Claim. (Cl. 43—42.35)

ABSTRACT OF THE DISCLOSURE

A hollow fishing lure having a cavity therein to provide a predetermined buoyancy in water with the lure made of two parts engaged by adhesive means. A semi-cylindrical weight is retained in the body by dowels integral with the body for adjusting the attitude and buoyancy in water from fresh to various degrees of salt density.

This invention relates in general to fishing lures and more particularly to a plastic molded lure having predetermined buoyancy characteristics.

Prior lures of this general character tend to be unstable when submerged and drawn by a line in the usual manner because of loose or indefinite positioning of ballast therein.

The present invention overcomes the above objection by the provision of a plastic molded lure generally of fingerling size which is composed of two members secured together including a strategically shaped and placed weight means for controlling the buoyancy and stabilizing the attitude of the lure.

A principal object of the invention is the provision of a two-piece molded fishing lure having a cavity therein including internal means for supporting a weight below the center of gravity thereof.

A further object of the invention is the provision of a two-piece molded fishing lure with an internal dowel means for engaging a semi-cylindrical weight therein which is relatively simple to manufacture and low in cost.

These and other objects and advantages in one embodiment of the invention are described and shown in the following specification and drawing, in which:

FIG. 1 is a side elevation of the lure.

FIG. 2 is a top plan view thereof.

FIG. 3 is an enlarged cross sectional view taken through section line 3—3, FIG. 2.

FIG. 4 is a cross sectional plan view of the lure shown in FIG. 2 with portions broken away.

FIG. 5 is a cross sectional view taken through section line 5—5, viewing the forward portion of the lure shown in FIG. 1.

FIG. 6 is a perspective view of the weight shown in FIGS. 3, 4, and 5.

Referring to FIG. 1, the lure is comprised of two molded parts 1 and 2, preferably made of transparent materials, such as polystyrene, acrylic or similar compounds, joined at a junction J by compatible adhesive means.

The simulated scales 3 are preferably internally molded and are preferably visually enhanced by an internal reflector means positioned adjacent thereto, not shown. A screw eye 4 is threaded into the rear end of part 2, as shown, for hook attachment and a second optional eye may be threaded into the forward part 1, as indicated by dotted lines.

Referring to FIGS. 3 and 4, a cavity 5 is provided within both parts of the lure to provide primary buoyancy thereto when submerged and a pair of central longitudinal ribs 6—6 are provided in each portion 1 and 2, respectively, which terminate in cylindrical coaxial projections or dowels 7—7, respectively.

Referring to FIG. 6, a ballast member or weight 8, preferably of lead or lead alloy, is generally semi-cylindrical in shape with a planar upper side parallel to the major axis thereof and is provided with a pair of coaxial cavities 9—9 in opposite ends thereof, as shown, and having a diameter slightly larger than the diameter of the dowels 7—7.

Upon assembly, the weight 8 and the reflectors, not shown, are positioned in the front part 1 of the lure and a compatible adhesive applied to the junction ends of parts 1 and 2 when the latter are apart, as indicated in FIG. 2. When the parts 1 and 2 are urged into assembled positions, as shown in FIGS. 3 and 4, forming junction J, then the cavities 9—9 in weight 8 will be engaged by dowels 7—7, as shown, and the lure will constitute a rigid assembly with the weight 8 contributing to the rigidity.

Since the cavity 5 is hermetically sealed, it is apparent that changes in the vertical dimension of the weight 8 will control the degree of buoyancy of the lure in either fresh or salt water dependent upon the number and weight of the hooks employed.

It is also apparent that various compatible colored finishes may be applied to the lure to more nearly simulate natural fish.

Having described my invention, I claim:

1. A fishing lure simulating a fish comprising a body member for submersion in water and formed from a front and a rear part joined together at a transverse junction by an adhesive means, each of said parts having a cavity extending therein from said junction for providing a predetermined buoyancy to said body when submerged in said water, a longitudinal rib formed on the lower portion of each cavity, a projection on each rib extending in coaxial spaced relation toward each other in longitudinal relation to said body, a ballast member of predetermined weight having a semi-cylindrical form with an upper planar surface disposed below the longitudinal axis of the body and substantially normal to the plane of said transverse junction and a recess in each opposite end thereof, each said projection being cylindrical in shape and said recesses in said ballast member being of cylindrical shape for coaxial engagement with said cylindrical projections for adjusting the said buoyancy and the attitude of said body when submerged in water and rigidifying the junction of said parts against shock.

References Cited

UNITED STATES PATENTS

| | | | |
|---|---|---|---|
| 1,892,892 | 1/1933 | Jamar | 43—42.35 X |
| 2,106,755 | 2/1938 | McArthur | 43—42.35 |
| 3,035,368 | 5/1962 | Collins | 43—42.39 |

SAMUEL KOREN, *Primary Examiner.*

D. J. LEACH, *Assistant Examiner.*